(12) United States Patent
Nishimura

(10) Patent No.: US 12,720,203 B2
(45) Date of Patent: Aug. 25, 2026

(54) CONTROLLING APPARATUS, CONTROLLING METHOD, AND STORAGE MEDIUM

(71) Applicant: CANON KABUSHIKI KAISHA, Tokyo (JP)

(72) Inventor: Ryutaro Nishimura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 70 days.

(21) Appl. No.: 18/965,677

(22) Filed: Dec. 2, 2024

(65) Prior Publication Data

US 2025/0184607 A1 Jun. 5, 2025

(30) Foreign Application Priority Data

Dec. 4, 2023 (JP) ................................ 2023-204716

(51) Int. Cl.
*H04N 23/69* (2023.01)
*G06T 3/40* (2024.01)
*H04N 23/695* (2023.01)

(52) U.S. Cl.
CPC ............... *H04N 23/69* (2023.01); *G06T 3/40* (2013.01); *H04N 23/695* (2023.01)

(58) Field of Classification Search
CPC ......... H04N 23/69; H04N 23/695; G06T 3/40
See application file for complete search history.

(56) References Cited

U.S. PATENT DOCUMENTS 9,215,370 B2 * 12/2015 Lee ...................... H04N 23/667
12,542,967 B2 * 2/2026 Yanagibashi .......... H04N 23/64
2011/0075016 A1 * 3/2011 Shimizu ............... H04N 23/811 348/E5.022
2012/0242780 A1 * 9/2012 Yamashita ........... H04N 23/698 348/E5.051
2015/0191118 A1 * 7/2015 Matsukawa ............ H04N 7/183 348/148
2017/0272637 A1 * 9/2017 Kawazoe ............... G02B 7/102
2017/0372485 A1 * 12/2017 Tsunashima .............. G06T 7/20
2019/0387171 A1 * 12/2019 Juang ...................... H04N 23/62
2021/0342562 A1 * 11/2021 Asanuma ............... H04N 23/69
2023/0046658 A1 * 2/2023 Bowers ................... G10L 13/10
2024/0005529 A1 * 1/2024 Kim ........................ G06T 7/246

FOREIGN PATENT DOCUMENTS

JP 2014007653 A 1/2014
JP 2016048892 A 4/2016
JP 2018182417 A 11/2018
JP 2018538712 A 12/2018

* cited by examiner

*Primary Examiner* — Chiawei Chen
(74) *Attorney, Agent, or Firm* — Canon U.S.A., Inc. IP Division

(57) ABSTRACT

A portion of a captured image is set as a crop region. A process of changing at least one of a position or size of the crop region within a range of the captured image is executed upon receiving at least one of a request to change the position of the crop region or a request to change the size of the crop region. In a case where the crop region overlaps a predetermined area within the range of the image capturing image, an image capturing region of the image capturing unit is changed so that the crop region does not overlap the predetermined area.

11 Claims, 12 Drawing Sheets

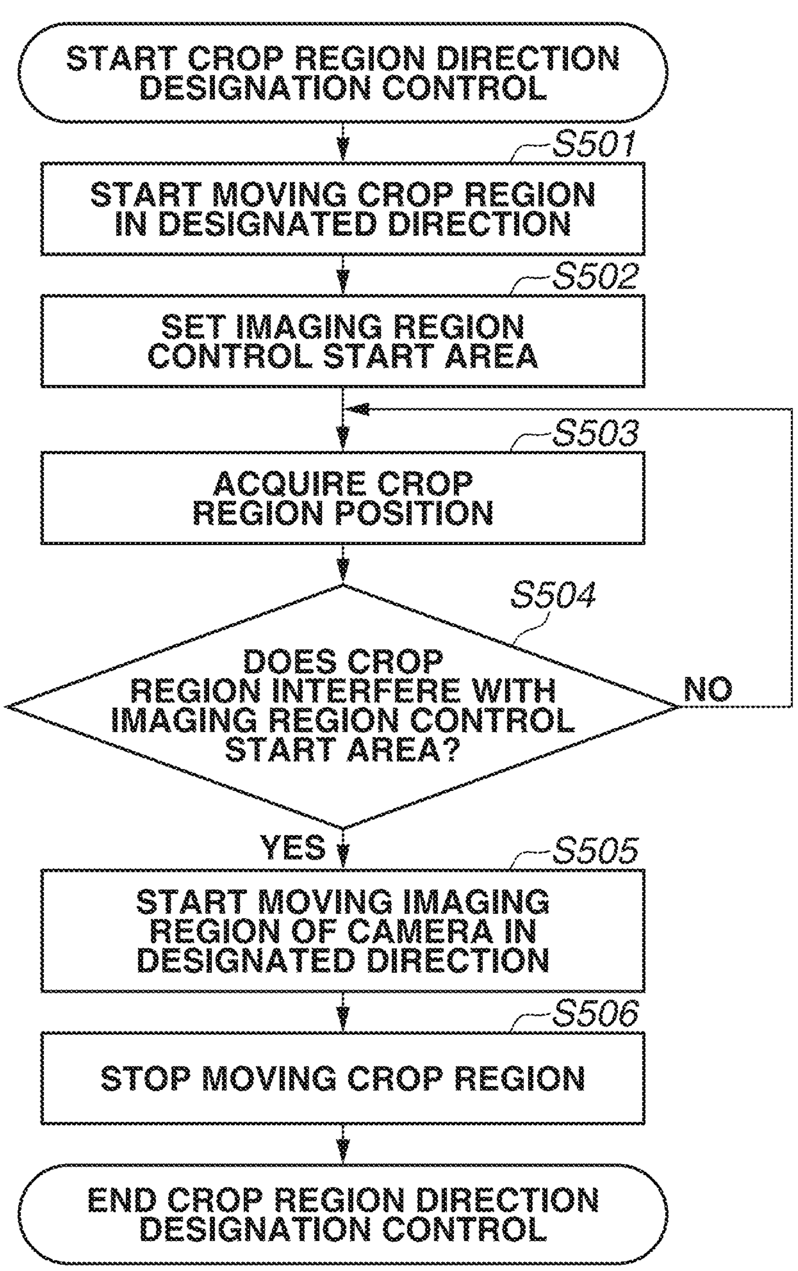
FIG.5
START CROP REGION DIRECTION DESIGNATION CONTROL
S501
START MOVING CROP REGION IN DESIGNATED DIRECTION
S502
SET IMAGING REGION CONTROL START AREA
S503
ACQUIRE CROP REGION POSITION
S504
DOES CROP REGION INTERFERE WITH IMAGING REGION CONTROL START AREA?
NO
YES
S505
START MOVING IMAGING REGION OF CAMERA IN DESIGNATED DIRECTION
S506
STOP MOVING CROP REGION
END CROP REGION DIRECTION DESIGNATION CONTROL

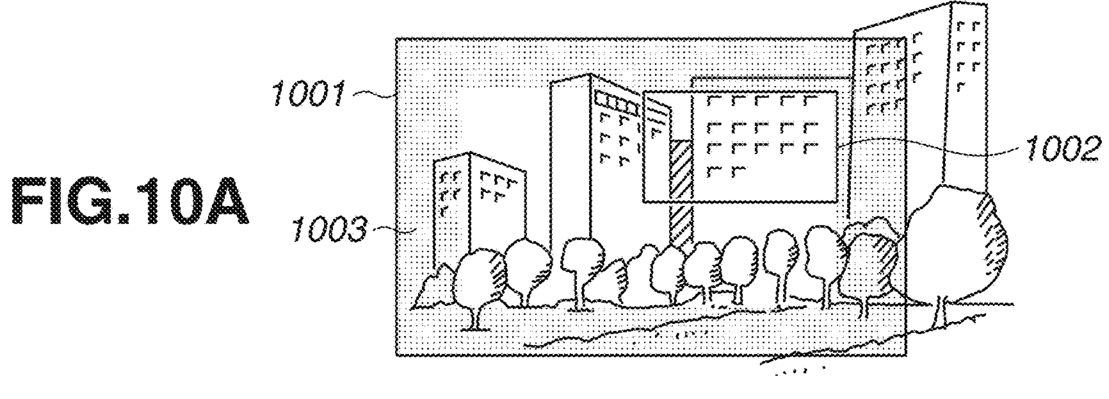
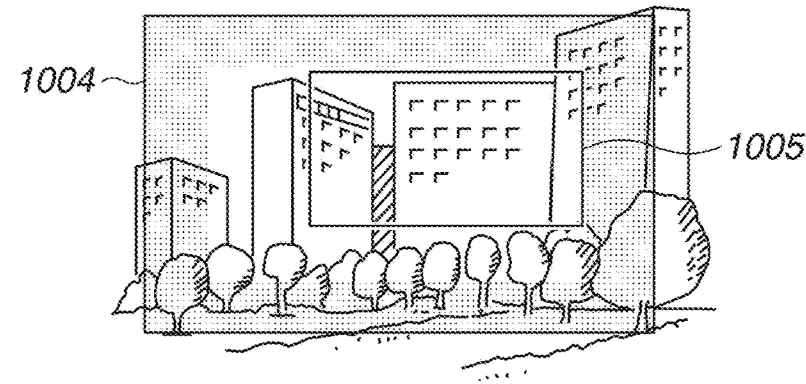
FIG.10B
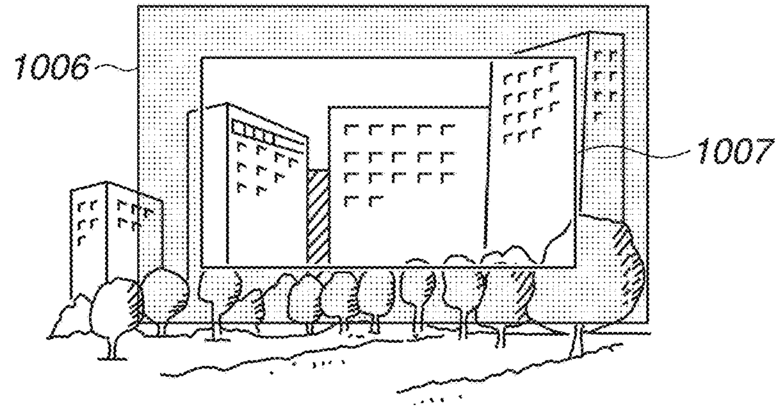
FIG.10C
1008
FIG.10D 1101
1103
CROP 2
CROP 1
1102
1104

1106
1103
CROP 2
CROP 1
1105

1108
1103
CROP 2
CROP 1
1107

1110
1103
CROP 2
CROP 1
1109

1201
1203
CROP 2
CROP 1
1202
1204

1206
1203
CROP 2
CROP 1
1205

1208
1203
CROP 2
CROP 1
1207

1210
1203
CROP 2
CROP 1
1209

CONTROLLING APPARATUS, CONTROLLING METHOD, AND STORAGE MEDIUM

BACKGROUND

Field

The present disclosure relates in particular to a controlling apparatus that can be used to crop a portion from a video and perform video output, a controlling method, and a storage medium.

Description of the Related Art

In recent years, moving image editing and distributing systems using Internet Protocol (IP) networks, such as the Internet, are increasing in video production. In such a system, in general, a moving image editing device, such as a switcher, receives video data, including video and audio, output from a camera connected to an IP network, and the video data is edited as broadcast video as needed. Then, the broadcast video is distributed and output.

Further, in recent years, personal computers (PCs) and controllers remotely control the image quality settings, and pan, tilt, and zoom of cameras via IP networks. Furthermore, there is an increasing trend toward obtaining videos captured by cameras via IP networks rather than conventional video cables, such as Serial Digital Interface (SDI).

Consequently, there is an increasing number of cases where no cameraman is present at image capturing locations.

Further, cameras with a function of cropping a portion from a video showing an imaging angle of view and performing video output are known. In the case of cropping a video outside an imaging angle of view and performing video output, the cameras perform a two-step operation of controlling the pan, tilt, and zoom of the camera to enclose a region to be cropped within the imaging angle of view and thereafter setting a crop region. To simplify the operation, technologies that make it possible to crop a video outside an imaging angle of view and perform video output with just a crop region setting by panning, tilting, and zooming the camera in response to the crop region setting are discussed.

Japanese Patent Application Laid-Open No. 2018-1824171 discusses a method for setting a target region for image processing, such as cropping and masking, in a display region where an image captured by a camera is displayed. In this method, an image capturing direction of the camera is controlled to be moved in a direction corresponding to an end portion of the captured image in a case where the region for image processing in the displayed image in the display section is moved to a position corresponding to the end portion and predetermined conditions are satisfied.

Further, Japanese Patent Application Laid-Open No. 2014-7653 discusses a method in which a mobile terminal transmits angle of view change information to a camera and a speed of changing an angle of view of a displayed image is increased. In this method, in a case where the angle of view change information for moving a crop region to a position outside an imaging angle of view is received by the camera, an imaging direction of the camera is operated based on the angle of view change information after the crop region is moved to an end of the imaging angle of view.

However, the methods discussed in Japanese Patent Application Laid-Open Nos. 2018-182417 and 2014-7653 both control the imaging direction when the crop region comes into contact with the end of the imaging angle of view, so that the crop region movement is paused, and the crop region cannot be moved smoothly. Thus, the pause at the moment of control switch may cause a decrease in cropped video quality, and crop region operations that reflect the intentions of the user may not be produced.

SUMMARY

According to an aspect of the present disclosure, a controlling apparatus includes one or more processors, and one or more memories storing instructions that, when executed by the one or more processors, cause the one or more processors to acquire a captured image generated by an image capturing unit, set a portion of the captured image as a crop region, execute a process of changing at least one of a position or size of the crop region within a range of the captured image upon receiving at least one of a request to change the position of the crop region or a request to change the size of the crop region, and change an image capturing region of the image capturing unit so that the crop region does not overlap a predetermined area within the range of the captured image in a case where the crop region overlaps the predetermined area as a result of executing the process.

Further features of the present disclosure will become apparent from the following description of exemplary embodiments with reference to the attached drawings.

BRIEF DESCRIPTION OF THE DRAWINGS

FIG. 5 is a flowchart illustrating an example of a crop region direction designation control process according to a first exemplary embodiment.

FIGS. 10A to 10D are diagrams illustrating a crop region, an imaging region control start area, and an imaging region of a camera in a case where a crop region enlargement operation is performed.

DESCRIPTION OF THE EMBODIMENTS

Various exemplary embodiments for implementing the present disclosure will be described in detail below with reference to the attached drawings. It should be noted that the exemplary embodiments described below are merely examples of how the present disclosure can be realized, appropriate modifications or changes should be made based on a configuration of an apparatus to which the present disclosure is applied and various conditions, and the invention is not limited to the exemplary embodiments described below. Each exemplary embodiment makes it possible to preserve high video quality within a crop region set by cropping a portion of a captured image in a case where an instruction to change the crop region is issued.

Figure 1:
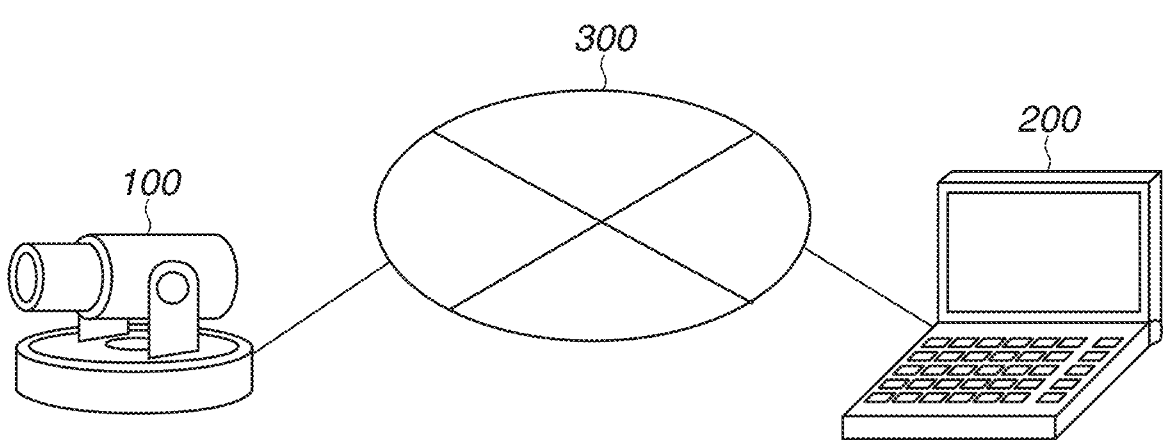
FIG. 1 is a diagram illustrating an example of a schematic configuration of an image capturing system according to an exemplary embodiment.

FIG. 1 is a diagram illustrating an example of a schematic configuration of an image capturing system according to the present exemplary embodiment. The image capturing system includes a camera 100 and a controller 200, and the camera 100 and the controller 200 are connected to each other via an Internet Protocol (IP) network 300. As a basic function, the camera 100 transmits captured camera video to the controller 200 via the IP network 300. According to the present exemplary embodiment, the camera 100 is a pan-tilt-zoom (PTZ) camera capable of panning, tilting, and zooming. The controller 200 connects to the camera 100 via the IP network 300 to acquire the camera video from the camera 100 and control the camera 100. In the example illustrated in FIG. 1, only one camera is illustrated. However, a single controller may control a plurality of cameras.

Figure 2:
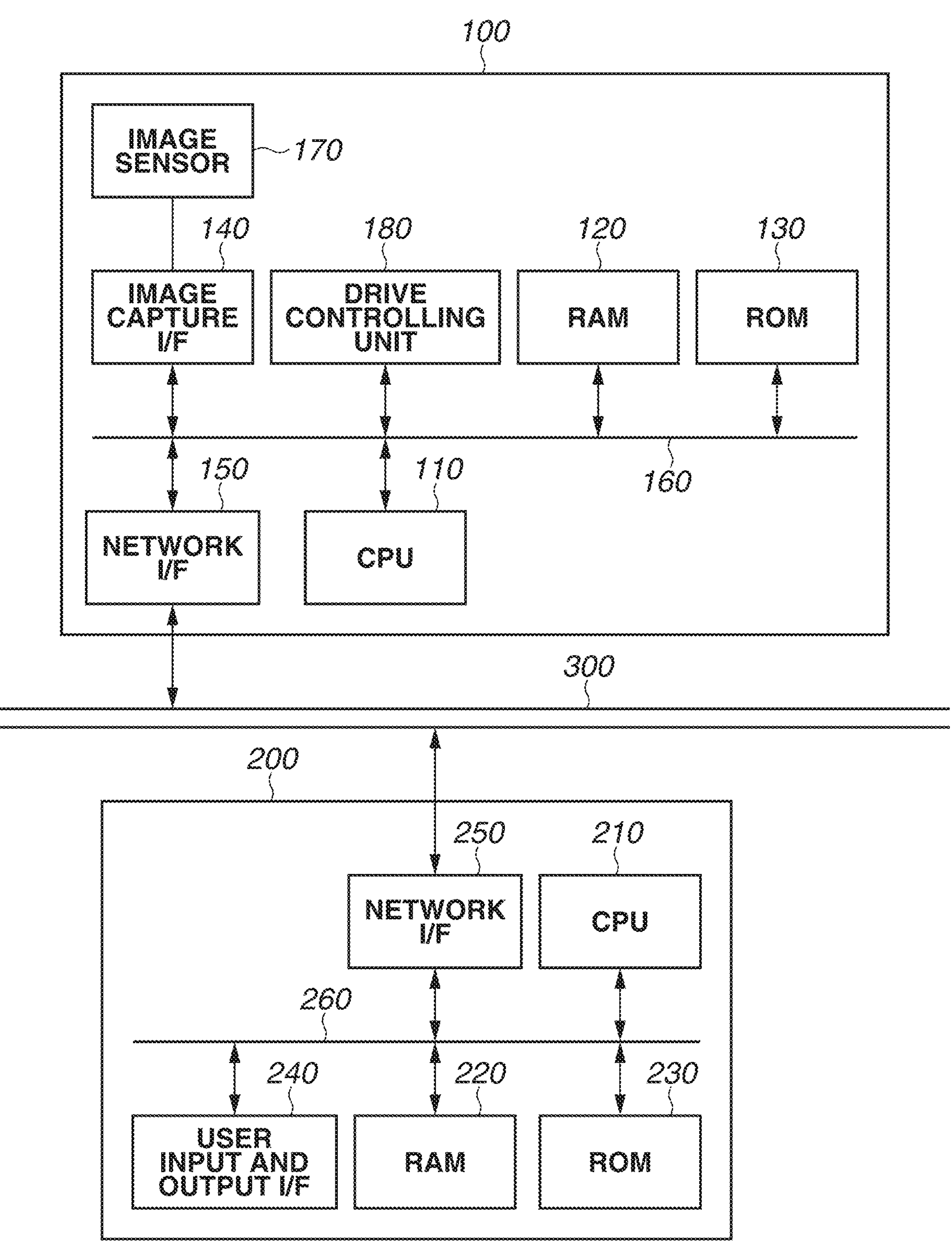
FIG. 2 is a block diagram illustrating an example of hardware configurations of a camera and a controller.

FIG. 2 is a block diagram illustrating an example of hardware configurations of the camera 100 and the controller 200.

First, a configuration of the camera 100 will be described below. In the camera 100, a central processing unit (CPU) 110, a random access memory (RAM) 120, a read-only memory (ROM) 130, an image capture interface (image capture I/F) 140, a network interface (network I/F) 150, and a drive controlling unit 180 are connected to each other via an internal bus 160.

The CPU 110 controls the entire camera 100. The RAM 120 is a volatile storage device, such as a dynamic RAM (DRAM). An operating system (OS), various programs, and various types of data are loaded into the RAM 120. Further, the RAM 120 is also used as a work area for the OS and various programs. The ROM 130 is a non-volatile device, such as a flash memory, a hard disk drive (HDD), a solid state drive (SSD), or a Secure Digital (SD) card. The ROM 130 is used as a permanent storage area for the OS, various programs, and various types of data. The ROM 130 is also used as a temporary storage area for various types of data.

The image capture I/F 140 is connected to an image sensor 170 composed of an image capturing element, such as charge-coupled device (CCD) sensor or complementary metal-oxide-semiconductor (CMOS) sensor. The image capture I/F 140 converts image data acquired from the image sensor 170 into a predetermined format, compresses the data if necessary, and transfers the data to the RAM 120. Further, the image capture I/F 140 also performs an image quality adjustment process, such as zooming, focusing, and exposure control, during the acquisition of image data from the image sensor 170 and a cropping process of cropping a portion of image data as a crop region. The drive controlling unit 180 executes pan and tilt control based on instructions from an external communication apparatus, such as the controller 200, via the network I/F 150.

The network I/F 150 is an interface for connecting to the IP network 300 and is responsible for communication with external communication apparatuses, such as the controller 200, via a communication medium, such as Ethernet®. Examples of communication that is performed according to the present exemplary embodiment include transmission and reception of requests from the controller 200 and responses and transmission of camera video to the controller 200. To simplify the explanation, the present exemplary embodiment describes an example in which the camera 100 is controlled remotely via the network I/F 150. However, another interface (I/F) such as a serial communication I/F (not illustrated) may be included. Similarly, to simplify the explanation, an example in which the transmission of video captured by the camera 100 is performed via the network I/F 150 is described. However, the transmission may be performed via another video output I/F. For example, the transmission of camera video may be performed via a video output I/F such as a High-Definition Multimedia Interface (HDMI®) (not illustrated) or Serial Digital Interface (SDI).

Next, a configuration of the controller 200 will be described below. In the controller 200, a CPU 210, a RAM 220, a ROM 230, a user input and output I/F 240, and a network I/F 250 are connected to each other via an internal bus 260. The CPU 210, the RAM 220, the ROM 230, and the network I/F 250 are respectively similar to the CPU 110, the RAM 120, the ROM 130, and the network I/F 150 of the camera 100, so that descriptions thereof will be omitted.

The user input and output I/F 240 is an interface for receiving user operations on the controller 200 and outputting video to users. Examples of the user input and output I/F 240 include interfaces for connecting to a button, a dial, a joystick, a display, or a touch panel. The touch panel and the display may be configured as a display equipped with a touch panel capable of detecting touch positions. A user can control the connected camera 100 via any of the user input and output I/Fs 240. Further, the display can display the camera video.

Figure 3A:
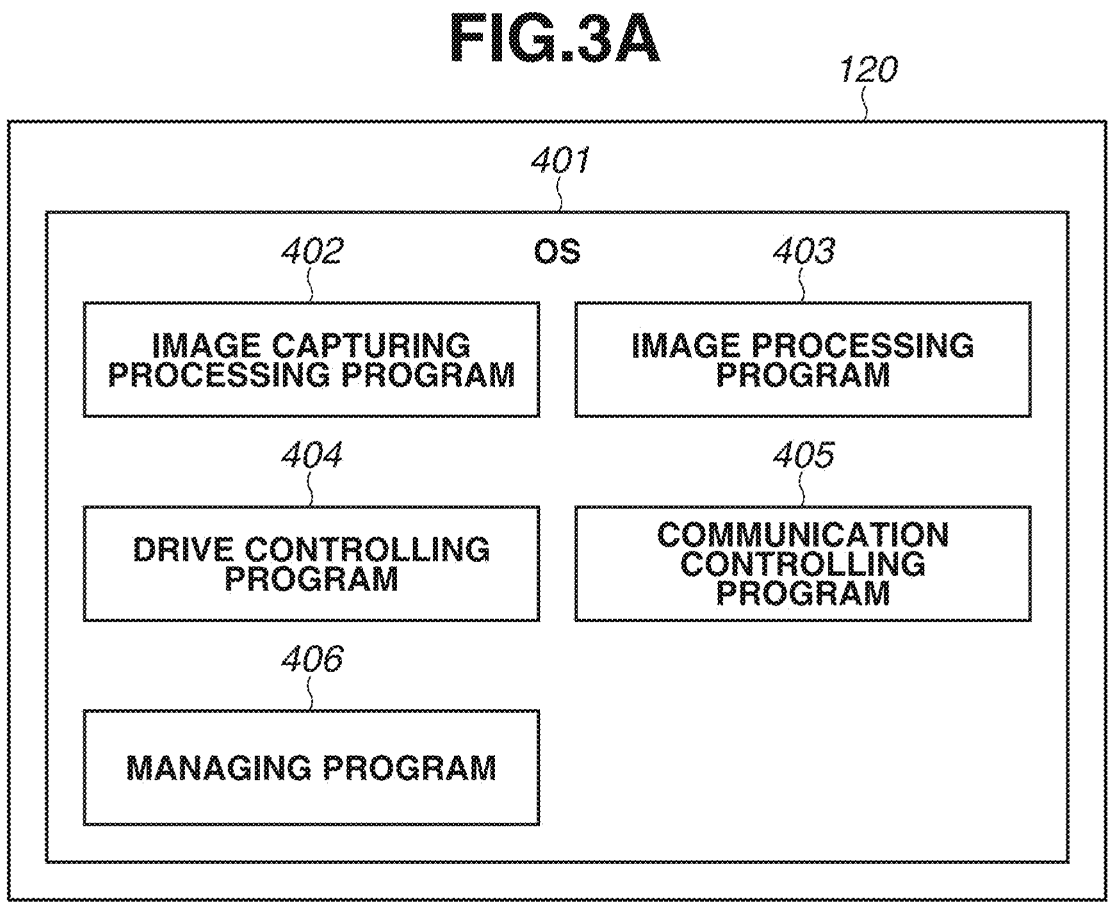
FIGS. 3A and 3B are diagrams illustrating an example of software configurations of the camera and the controller.
Figure 3B:
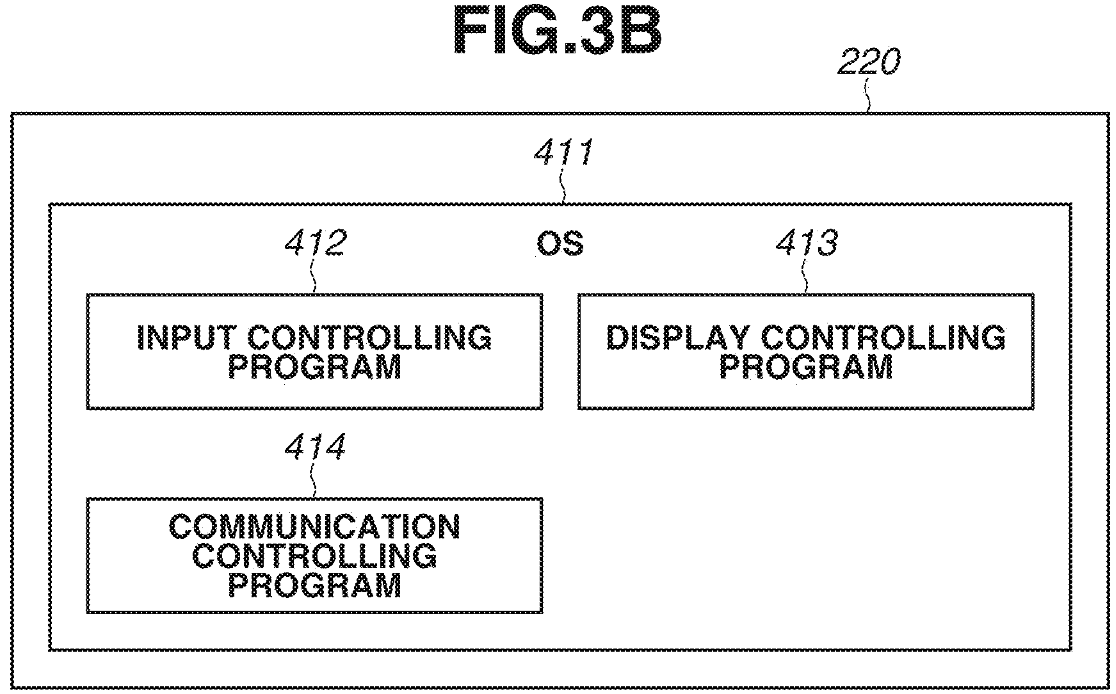

FIGS. 3A and 3B are diagrams illustrating examples of software configurations of the camera 100 and the controller 200. Details of software configurations of the camera 100 and the controller 200 will be described below.

FIG. 3A is a diagram illustrating an example of a software configuration of the camera 100. As illustrated in FIG. 3A, when the CPU 110 executes a program, the program is loaded into the RAM 120. Specifically, an OS 401, an image capturing processing program 402, an image processing program 403, a drive controlling program 404, a communication controlling program 405, and a managing program 406 are loaded into the RAM 120.

The OS 401 is a fundamental program configured to control the entire camera 100. The image capturing processing program 402 controls the image capture I/F 140 and generates data acquired from the image sensor 170 as image data based on image acquisition requests from external communication apparatuses or instructions from other programs. The image processing program 403 performs various types of image processing on the image data generated by the image capturing processing program 402 based on instructions from external communication apparatuses or other programs. The various types of image processing include changing the brightness, color balance, or size, and setting or changing a crop region. The various types of image processing further include converting into still image data, such as Joint Photographic Experts Group (JPEG) data, or moving image data, such as H.264 data. The image data (camera video) that has undergone the various types of image processing and result information about the various types of image processing are passed to the communication controlling program 405.

The drive controlling program 404 controls the drive controlling unit 180 and the image capture I/F 140 and performs pan-tilt-zoom position control on the camera 100 based on pan-tilt-zoom control requests from external communication apparatuses or instructions from other programs. The communication controlling program 405 controls the network I/F 150 and communicates with external communication apparatuses such as the controller 200 via the IP network 300. For example, the communication controlling program 405 receives requests such as an acquisition request for the camera video acquired from the image sensor 170, an image processing request for the camera video, and a crop region control request, such as panning, tilting, and zooming. Then, the communication controlling program 405 passes the requests to the managing program 406. Further, the communication controlling program 405 transmits the camera video and the result information about the various types of image processing received from the image processing program 403 to an external communication apparatuses as a response to the image processing request or a camera information update notification.

The managing program 406 sets an imaging region control start area, which will be described below, relative to an imaging angle of view of the camera 100 and detects the positional relationship with respect to the crop region. The imaging region control start area is an area that is set to restrict the movement of the crop region, and details thereof will be described below. The control start area serves as an area for determining whether to execute control based on changes in the range of the crop region. Further, the managing program 406 determines whether to perform crop region position control or pan-tilt-zoom control on the camera 100 in response to the crop region control request based on the positional relationship detection result. Then, the managing program 406 issues instructions to the image processing program 403 or the drive controlling program 404 based on the determination result. The acquisition request, the image processing request, and the control request may use a common communication protocol such as Hypertext Transfer Protocol (HTTP).

FIG. 3B is a diagram illustrating an example of a software configuration of the controller 200. As illustrated in FIG. 3B, when the CPU 210 executes a program, the program is loaded into the RAM 220. Specifically, an OS 411, an input controlling program 412, a display controlling program 413, and a communication controlling program 414 are loaded into the RAM 220.

The OS 411 is a basic program configured to control the entire controller 200. The input controlling program 412 controls the user input and output I/F 240 and receives user operation information from buttons, dials, a joystick, and a touch panel. Then, the input controlling program 412 generates various control commands based on the received operation information and passes the generated control commands to the communication controlling program 414. Further, as needed, the input controlling program 412 generates user setting information based on the operation information and passes the user setting information to the display controlling program 413.

The display controlling program 413 controls the user input and output I/F 240 based on the information received by the communication controlling program 414 and displays an on-screen display (OSD) of the camera video captured by the camera 100 and the result information about the various types of image processing on a display unit such as a display. Further, the display controlling program 413 also displays an OSD of the user setting information received from the input controlling program 412.

The communication controlling program 414 receives control commands from the input controlling program 412, controls the network I/F 250, and performs communication processes such as transmitting requests to and receiving responses from external communication apparatuses such as the camera 100. In a case where a response is received from an external communication apparatus, the communication controlling program 414 passes the response to the display controlling program 413. For example, the communication controlling program 414 transmits an acquisition request for the camera video captured by the camera 100, an image processing request for various types of image processing, and a crop region control request, such as panning, tilting, and zooming, and receives responses to the requests. Further, the communication controlling program 414 receives a camera information update notification from the camera 100 and passes the received notification to the display controlling program 413. The camera 100 transmits a camera information update notification also in a case where the camera 100 is controlled by a device other than the controller 200. In this case, the communication controlling program 414 also receives the camera information update notification from the camera 100 and passes the received notification to the display controlling program 413.

Figure 4:
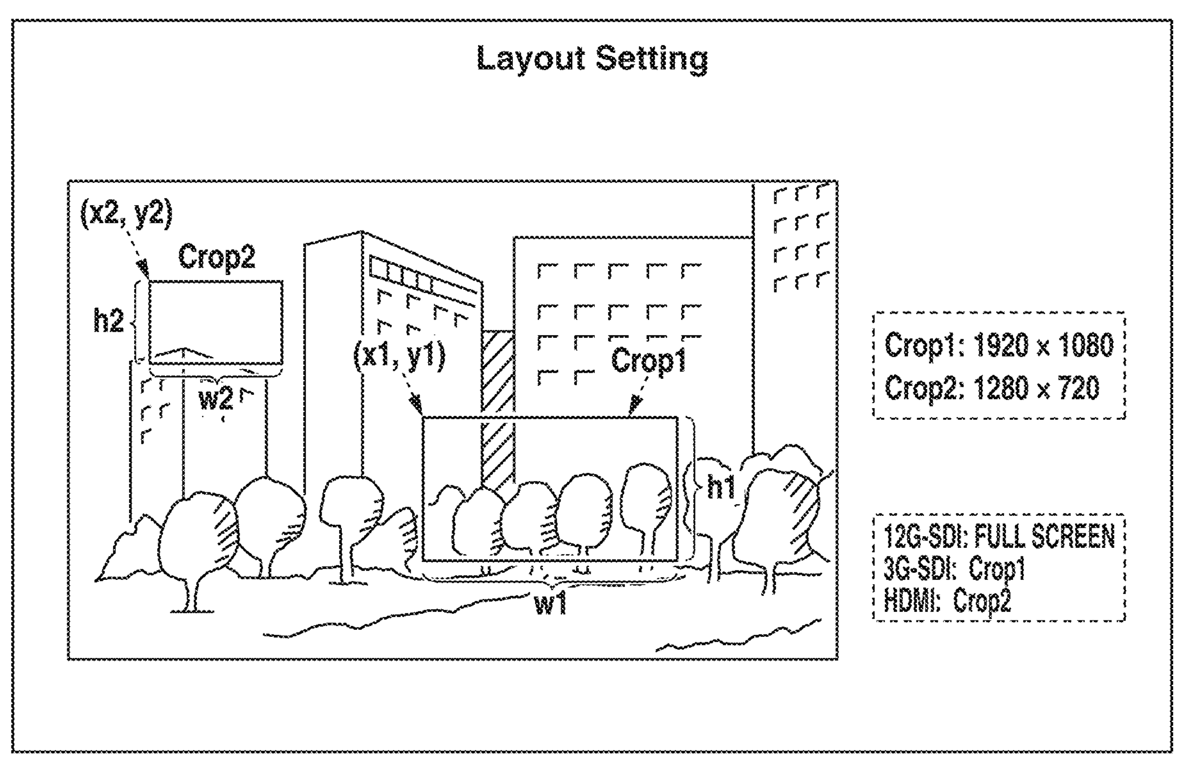
FIG. 4 is a diagram illustrating an example of a screen displaying crop region information overlaid on a camera video.

Next, crop region information that is retained as user setting information when a user issues a crop region setting and control instruction via the user input and output I/F 240 of the controller 200 will be described below with reference to FIG. 4. In a case where the user operates the touch panel and issues a crop region setting instruction via the user input and output I/F 240, the input controlling program 412 generates crop region information, and the display controlling program 413 displays the crop region information on the OSD. During OSD display, a layout setting screen for setting a layout for displaying crop regions is displayed as illustrated in FIG. 4. On the layout setting screen, resolutions of the camera video acquired from the camera 100, the number and locations of crop regions, and a crop region for each output terminal are also displayed as crop region information and can be selected by the user from the layout setting screen.

As illustrated in FIG. 4, the crop region information includes coordinates (x, y), widths w, and heights h of crop regions in the camera video and display region priority settings for each output terminal. Further, spherical coordinates of four corner points of each crop region that are calculated from camera information, such as coordinates, widths, heights, pan-tilt-zoom positions, and video inversion states in the camera video, may also displayed as crop region information.

Further, according to the present exemplary embodiment, an instruction to change a crop region illustrated in FIG. 4 by moving, enlarging, or reducing the crop region may be issued, and when the crop region is moved, direction designation control is performed with a designated movement direction and movement speed of the crop region. In this case, the input controlling program 412 generates a direction designation control command in which a movement direction and a movement speed are designated, and passes the generated control command to the communication controlling program 414. Then, the communication controlling program 414 transmits the control command as a control request to the camera 100.

Next, an image capturing controlling process for crop regions and an imaging region of the camera 100 in the case where the crop region direction designation control is performed on the camera 100 will be described below with reference to FIGS. 5 and 6A to 6C. FIG. 5 is a flowchart illustrating an example of a crop region direction designation control process of the camera 100 according to the present exemplary embodiment. Crop region information about preset crop regions is stored in the ROM 130 of the camera 100. The process is started upon receiving a control request related to the crop region direction designation control from the controller 200.

First, in step S501, the CPU 110 starts moving a crop region within the range of the imaging region in a movement direction designated in the received control request and at a movement speed designated in the received control request using the image processing program 403. By this process, the CPU 110 instructs the image capture I/F 140 to perform a crop process and stores (updates) the position of the crop region after the movement as crop region information in the ROM 130.

Next, in step S502, the CPU 110 sets an imaging region control start area defined by a frame-shaped region with a specific width from an end portion within the range of the image capturing region of the camera 100 using the managing program 406. FIG. 6B illustrates an example of an imaging region control start area 604, but an area outside the range of the image capturing region is also set as a control start area. A width from an edge of an angle of view of the imaging region control start area may be determined by referring to the movement speed of the crop region and/or speed information about the drive controlling unit 180. Further, the imaging region control start area may be set for each of pan, tilt, and zoom.

Next, in step S503, the CPU 110 refers to the crop region information stored in the ROM 130 and acquires the current position of the crop region. Then, in step S504, the CPU 110 determines whether the acquired current position of the crop region interferes (overlaps) with the imaging region control start area using the managing program 406. In a case where the determination result indicates that the current position of the crop region does not interfere with the imaging region control start area (NO in step S504), the processing returns to step S503, and the current position of the crop region is acquired again. On the other hand, in a case where the current position of the crop region interferes with the imaging region control start area (YES in step S504), the processing proceeds to step S505.

In step S505, the CPU 110 transmits a pan-tilt direction designation control start command to the drive controlling unit 180 to move the imaging region of the camera 100 using the drive controlling program 404. When performing the pan-tilt direction designation control, the drive controlling unit 180 may carry over the designated direction of the crop region direction designation control. Further, pan-tilt movements may be combined considering the spherical coordinates to approach the designated direction of the crop region direction designation control as closely as possible.

Next, in step S506, the CPU 110 stops moving the crop region using the image processing program 403 and terminates the crop region direction designation control. By this process, the CPU 110 instructs the image capture I/F 140 to stop moving the crop region.

Figure 6A:
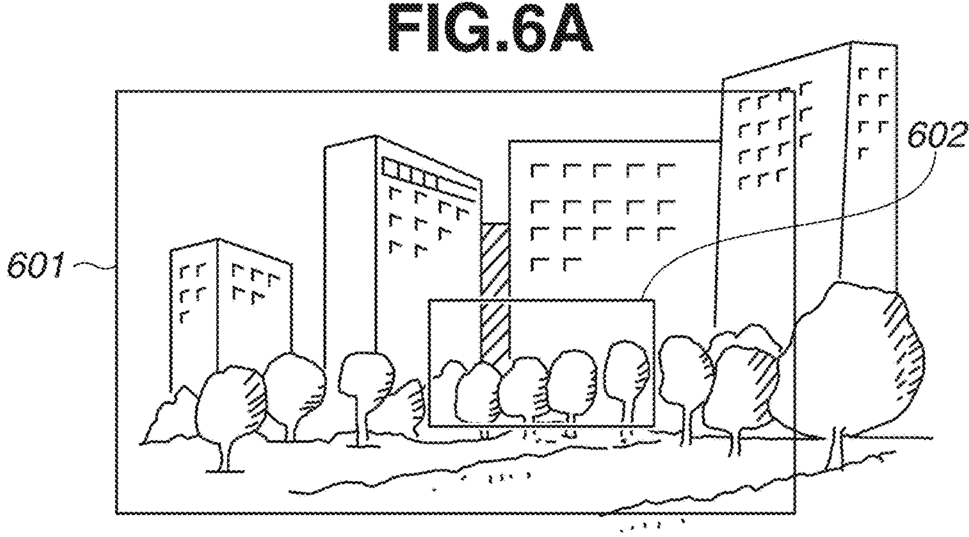
FIGS. 6A to 6C are diagrams illustrating a crop region, an imaging region control start area, and an imaging region of a camera in a case where direction designation control of the crop region to the right within the angle of view is performed.
Figure 6B:
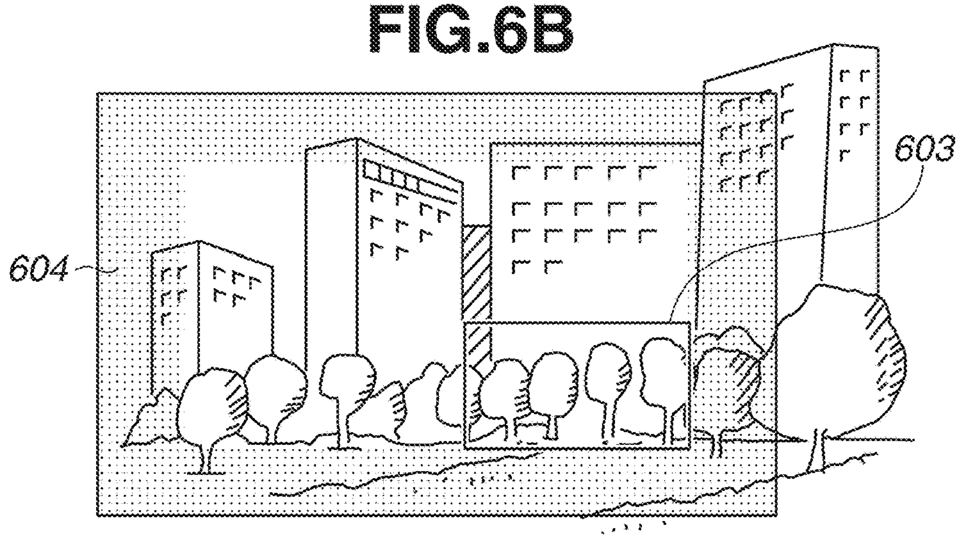
Figure 6C:
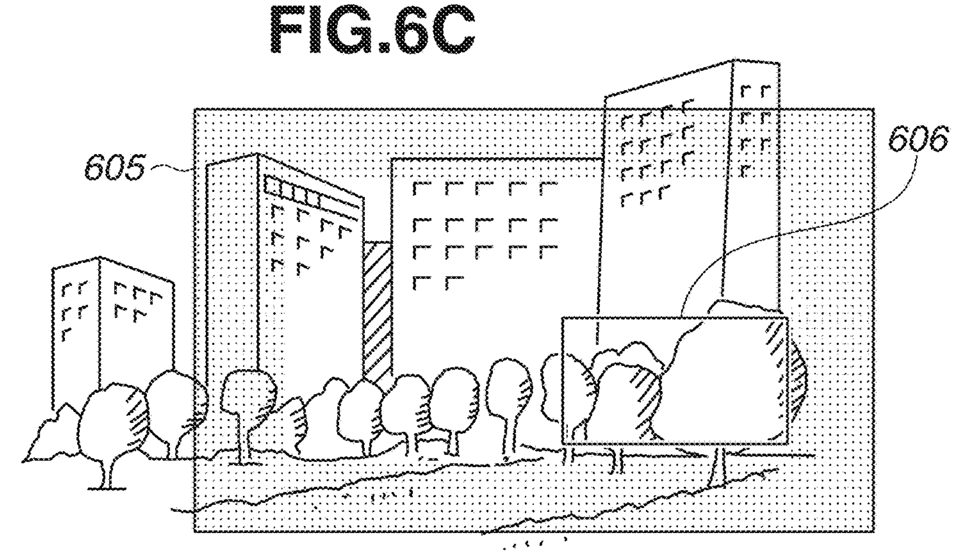

FIGS. 6A to 6C are diagrams illustrating a crop region, an imaging region control start area, and an imaging region of the camera 100 in a case where direction designation control of the crop region to the right within the angle of view is performed. FIG. 6A illustrates a state before the crop region direction designation control of the camera 100 is started. In the state illustrated in FIG. 6A, a crop region is cropped at a position 602 with respect to an imaging region 601 of the camera 100.

FIG. 6B illustrates a state where the crop region is moved to a position 603 from the position 602 in a case where crop region direction designation control of the camera 100 is performed. In the state illustrated in FIG. 6B, the imaging region control start area 604 is set as a result of the process illustrated in FIG. 5, and at this point, the crop region does not interfere with the imaging region control start area 604.

FIG. 6C illustrates a state where the imaging region of the camera 100 is moved to the right due to the interference of the crop region with the imaging region control start area 604. Due to the interference of the crop region with the imaging region control start area 604, the pan-tilt direction designation control of the imaging region of the camera 100 is started, and the imaging region of the camera 100 is moved to the right. Meanwhile, the movement of the crop region is stopped at a position 606. Consequently, in an imaging region 605 of the camera 100 after the movement, the crop region does not interfere with the imaging region control start area 604.

As described above, the present exemplary embodiment makes it possible for the user to operate the crop region without considering the imaging direction of the camera 100 in a case where crop region direction designation control of the image capturing apparatus is performed.

An example in which position designation control is performed to designate pan-tilt positions of a crop region directly during the movement of the crop region according to the present exemplary embodiment will be described below. Internal configurations of apparatuses of an image capturing system according to the present exemplary embodiment are similar to those according to the first exemplary embodiment, so that descriptions thereof will be omitted. Only the difference from the first exemplary embodiment will be described below.

When the position designation control is performed, the input controlling program 412 in the controller 200 generates a control command to set a crop region based on crop region information and passes the generated control command to the communication controlling program 414. Then, the communication controlling program 414 transmits the control command as a control request to the camera 100.

Figure 7:
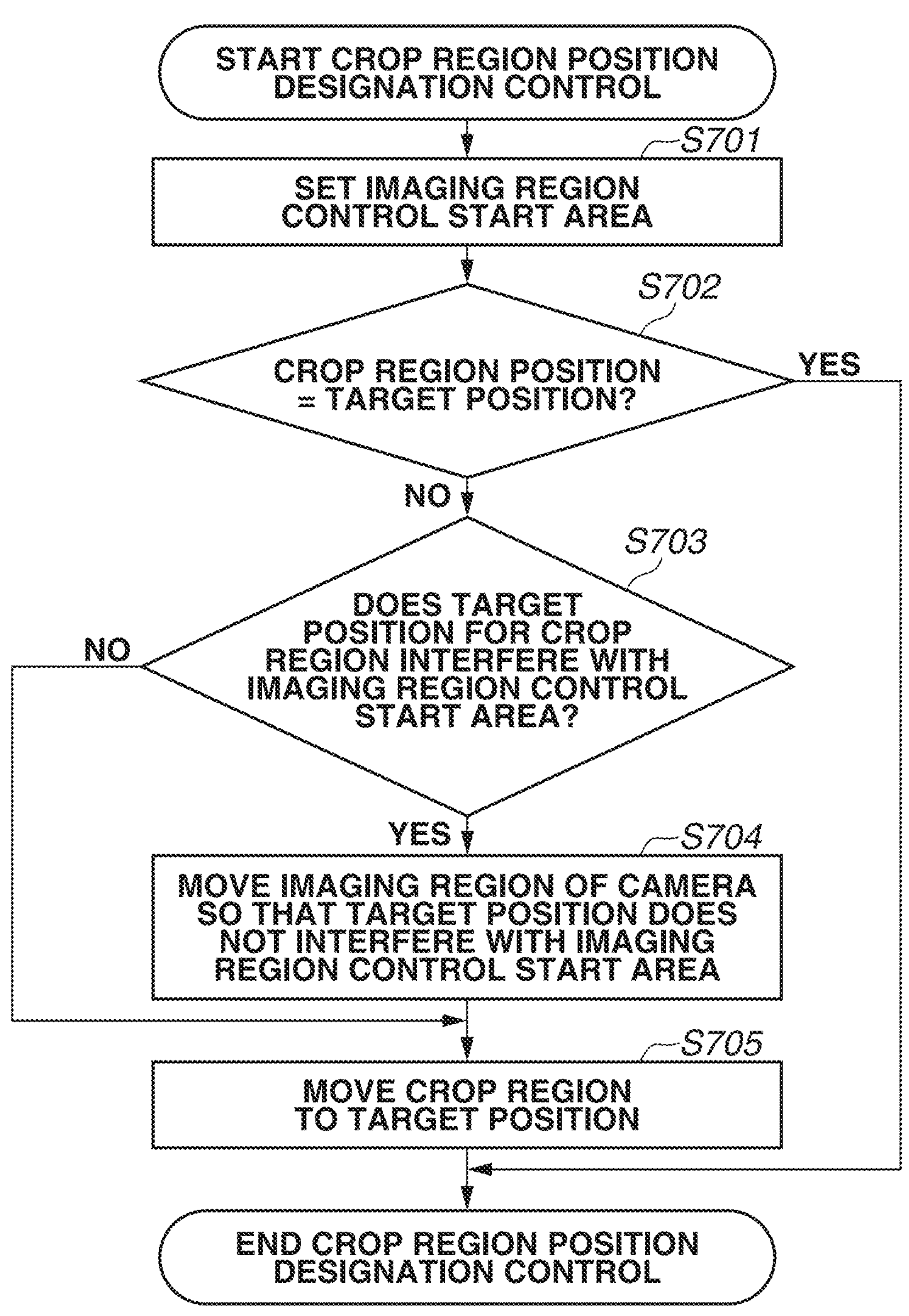
FIG. 7 is a flowchart illustrating an example of a crop region position designation control process according to a second exemplary embodiment.

An image capturing controlling process for crop regions and the imaging region of the camera 100 in a case where the crop region position designation control is performed on the camera 100 will be described below with reference to FIGS. 7 and 8A to 8C. FIG. 7 is a flowchart illustrating an example of a crop region position designation control process of the camera 100 according to the present exemplary embodiment. Crop region information about preset crop regions is stored in the ROM 130 of the camera 100. The process is started upon receiving a control request related to the crop region position designation control from the controller 200.

In step S701, the CPU 110 sets an imaging region control start area defined by a frame-shaped region with a specific width from an end of the imaging angle of view of the camera 100 using the managing program 406. This process is basically similar to the process of step S502 in FIG. 5.

Next, in step S702, the CPU 110 refers to the current crop region information and determines whether the current position of the crop region is the same as the designated target position of the crop region. In a case where the determination result indicates that the current position of the crop region is already the same as the target position (YES in step S702), the crop region position designation control is terminated. On the other hand, in a case where the current position of the crop region differs from the target position (NO in step S702), the processing proceeds to step S703.

In step S703, the CPU 110 determines whether the target position for the crop region interferes with the imaging region control start area, using the managing program 406. In a case where the determination result indicates that the target position for the crop region interferes with the imaging region control start area (YES in step S703), the processing proceeds to step S704. On the other hand, in a case where the target position for the crop region does not interfere with the imaging region control start area (NO in step S703), the processing proceeds to step S705.

In step S704, the CPU 110 transmits a pan-tilt position designation control start command to the drive controlling unit 180 using the drive controlling program 404 to move the imaging region of the camera 100. The imaging region of the camera 100 is moved so that the target position for the crop region does not interfere with the imaging region control start area.

Next, in step S705, the CPU 110 controls the image capture I/F 140 to move the current crop region to the target position using the image processing program 403 and terminates the crop region position designation control.

Figure 8A:
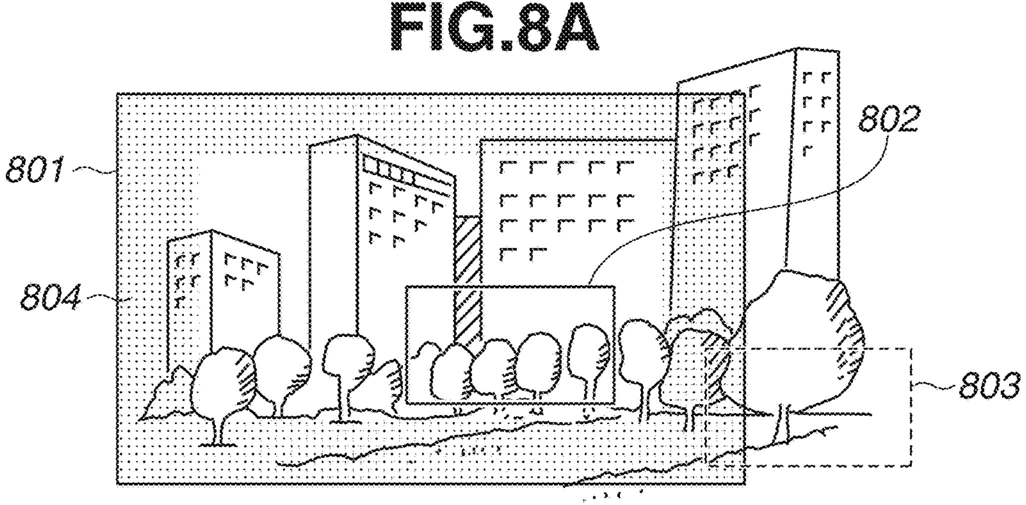
FIGS. 8A to 8C are diagrams illustrating a crop region, an imaging region control start area, and an imaging region of a camera in a case where position designation control of the crop region to a target position is performed.
Figure 8B:
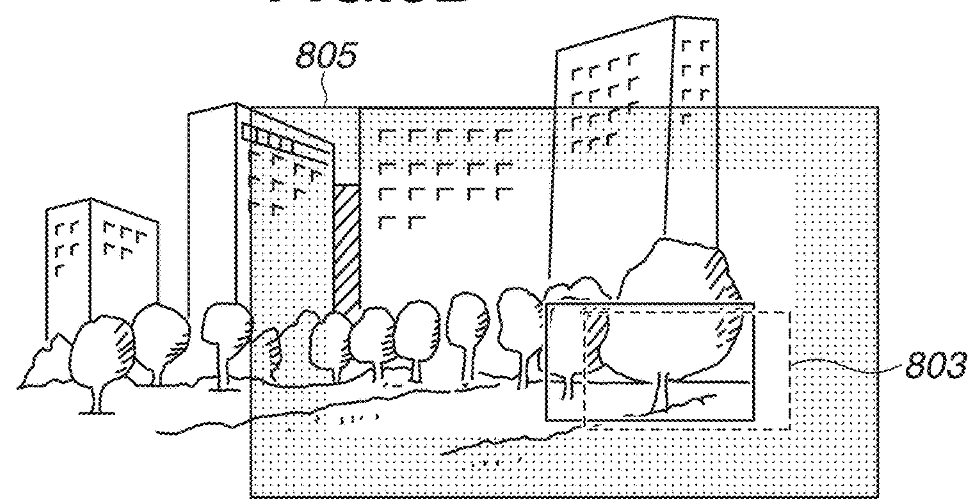
Figure 8C:
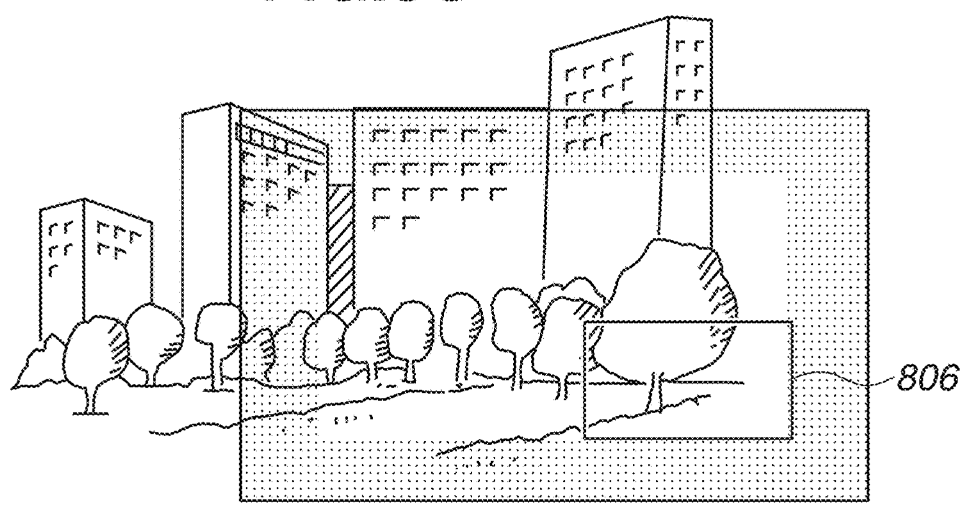

FIGS. 8A to 8C are diagrams illustrating a crop region, an imaging region control start area, and an imaging region of the camera 100 in a case where position designation control of the crop region to a target position is performed. FIG. 8A illustrates a state before the crop region position designation control of the camera 100 is started. In the state illustrated in FIG. 8A, a crop region is cropped at a position 802 with respect to an imaging region 801 of the camera 100. The control request related to the position designation control designates a target position 803 for the crop region, and the target position 803 interferes with a current imaging region control start area 804.

FIG. 8B illustrates a state where the imaging region of the camera 100 is moved to the right due to the interference of the target position 803 for the crop region with the imaging region control start area 804. As a result of moving the imaging region of the camera 100, the target position 803 for the crop region no longer interferes with the imaging region control start area 804.

FIG. 8C illustrates a state where the crop region is moved to a position 806 from the position 802. Since the target position 803 for the crop region no longer interferes with the imaging region control start area 804, the crop region becomes movable.

As described above, the present exemplary embodiment makes it possible for the user to operate the crop region without considering the imaging direction of the camera 100 in the case where the crop region position designation control is performed on an image capturing apparatus.

A process for crop regions and the imaging region of the camera 100 according to the present exemplary embodiment in the case where an operation of enlarging or reducing a crop region size is performed by the user will be described below. Either one of the direction designation control and the position designation control may be used in the operation of enlarging or reducing the crop region. Further, internal configurations and processes of apparatuses of an image capturing system according to the present exemplary embodiment are similar to those according to the first or second exemplary embodiment, so that descriptions thereof will be omitted. Only the difference from the first and second exemplary embodiments will be described below.

Figure 9A:
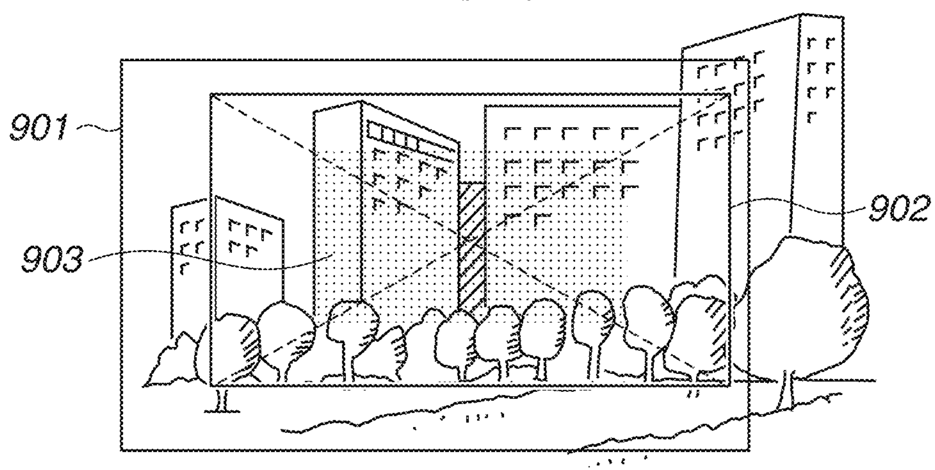
FIGS. 9A to 9C are diagrams illustrating a crop region, an imaging region control start area, and an imaging region of a camera in a case where a crop region reduction operation is performed.
Figure 9B:
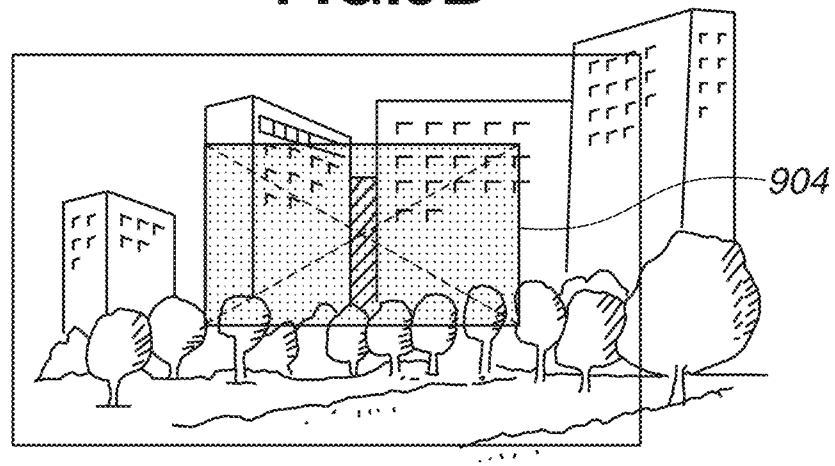
Figure 9C:
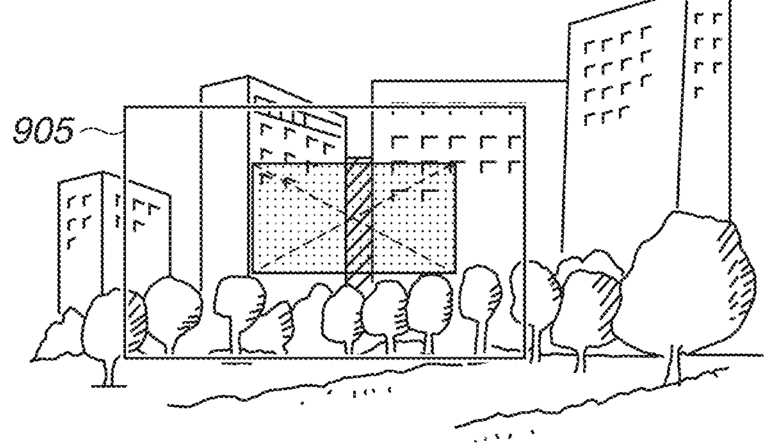

FIGS. 9A to 9C are diagrams illustrating a crop region, an imaging region control start area, and an imaging region of the camera 100 in a case where an operation of reducing a crop region size based on an output resolution is performed by the user. FIG. 9A illustrates a state before a crop region reduction operation is performed by the user. In the state illustrated in FIG. 9A, a crop region of a range 902 is cropped in an imaging region 901 of the camera 100. Upon receiving a control request related to a crop region reduction operation, an imaging region control start area 903 is set. In a case where a reduction operation is performed by the user, the imaging region control start area 903 is set as a region centered on the central coordinates of the crop region, with a size corresponding to the output resolution.

FIG. 9B illustrates a state where the crop region is reduced to a range 904 from the range 902 through the direction designation control as a result of a crop region reduction operation by the user. In the state illustrated in FIG. 9B, the crop region and the imaging region control start area 903 completely overlap as a result of the crop region reduction. According to the first exemplary embodiment, the imaging region is moved in a case where the crop region after the movement overlaps the imaging region control start area 604. On the contrary, in the case of the reduction operation according to the present exemplary embodiment, the zoom of the imaging region is changed when the crop region after the reduction interferes with (or is completely enclosed within) the imaging region control start area 903.

FIG. 9C illustrates a state where the imaging region of the camera 100 is reduced in the case where the crop region after the movement interferes with (or is completely enclosed within) the imaging region control start area 903. When the crop region after the reduction is completely enclosed within the imaging region control start area 903, the CPU 110 controls the image capture I/F 140 to move the zoom of the camera 100 toward the telephoto side. Further, the CPU 110 controls the drive controlling unit 180 to control the pan and tilt of the camera 100 so that the central coordinates of the crop region do not move. This makes it possible to reduce the crop region to the target range to conform to the range of the imaging region control start area 903 in the reduced imaging region 905 of the camera 100.

Further, a similar process is applied in the case of performing the position designation control to reduce the crop region when a crop region reduction operation is performed by the user. Specifically, in a case where the target position for the crop region (target range) is completely enclosed within the imaging region control start area 903, the range of the crop region is controlled to completely overlap the target range by changing the zoom of the imaging region.

FIGS. 10A to 10D are diagrams illustrating a crop region, an imaging region control start area, and an imaging region of the camera 100 in a case where a crop region size enlargement operation is performed by the user. FIG. 10A illustrates a state before a crop region enlargement operation is performed by the user. In the state illustrated in FIG. 10A, a crop region of a range 1002 is cropped in an imaging region 1001 of the camera 100. Upon receiving a control request related to a crop region enlargement operation, an imaging region control start area 1003 is set. In the case where an enlargement operation is performed by the user, the imaging region control start area 1003 is similar to those according to the first and second exemplary embodiments, but areas outside the angle of view of the image capturing region do not have to be set as the control start area 1003.

FIG. 10B illustrates a state where the crop region is enlarged to a range 1005 from the range 1002 through the direction designation control as a result of a crop region enlargement operation by the user. Upon receiving a control request related to a crop region enlargement operation, the CPU 110 controls the image capture I/F 140 to enlarge the crop region. Then, the CPU 110 further controls the drive controlling unit 180 to control the pan and tilt so that the crop region does not interfere with the imaging region control start area 1003, and moves an imaging region 1004 of the camera 100.

FIG. 10C illustrates a state where the crop region is further enlarged to a range 1007 through the direction designation control. In the state illustrated in FIG. 10C, the crop region cannot be prevented from interfering with the imaging region control start area 1003 even if an imaging region 1006 of the camera 100 is moved while enlarging the crop region.

FIG. 10D illustrates a state where an imaging region 1008 of the camera 100 is enlarged in the case where the crop region can no longer be enlarged without interfering with the imaging region control start area 1003. When the crop region can no longer be enlarged, the CPU 110 controls the image capture I/F 140 to move the zoom of the camera 100 toward the wide side. Further, the CPU 110 controls the drive controlling unit 180 to control the pan and tilt of the camera 100 so that the central coordinates of the crop region do not move. This makes it possible for the crop region to be enlarged to the target range without interfering with the imaging region control start area 1003.

On the other hand, in the case of performing the position designation control to enlarge the crop region when a crop region enlargement operation is performed by the user, the following process is applied. First, the CPU 110 controls the drive controlling unit 180 to control the pan and tilt of the camera 100 so that the central coordinates of the imaging region match the central coordinates of the target range for the crop region, and moves the imaging region of the camera 100. Then, if the target range for the crop region interferes with the imaging region control start area 1003, the zoom of the camera 100 is controlled to be moved toward the wide side until the target range no longer interferes with the imaging region control start area 1003.

As described above, the present exemplary embodiment makes it possible for the user to operate the crop region without considering the imaging direction of the camera 100 while maintaining the image quality of output crop video when an operation of enlarging or reducing a crop region size is performed on an image capturing apparatus.

The first exemplary embodiment describes an example in which one crop region is set in the imaging region of the camera 100. The present exemplary embodiment will describe a process for cases where a plurality of crop regions is set. Internal configurations of apparatuses of an image capturing system according to the present exemplary embodiment are similar to those according to the first exemplary embodiment, so that descriptions thereof will be omitted. Only the difference from the first exemplary embodiment will be described below.

In a case where a plurality of crop regions is set, a priority level is assigned to each crop region. For example, in a case where two crop regions are set, the process differs between moving the crop region with a lower priority level and moving the crop region with a higher priority level. The crop region information about each crop region that is stored in the ROM 130 of the camera 100 also includes the priority level information. The process for each case will be described below.

Figures 11A, 11B, 11C, 11D:
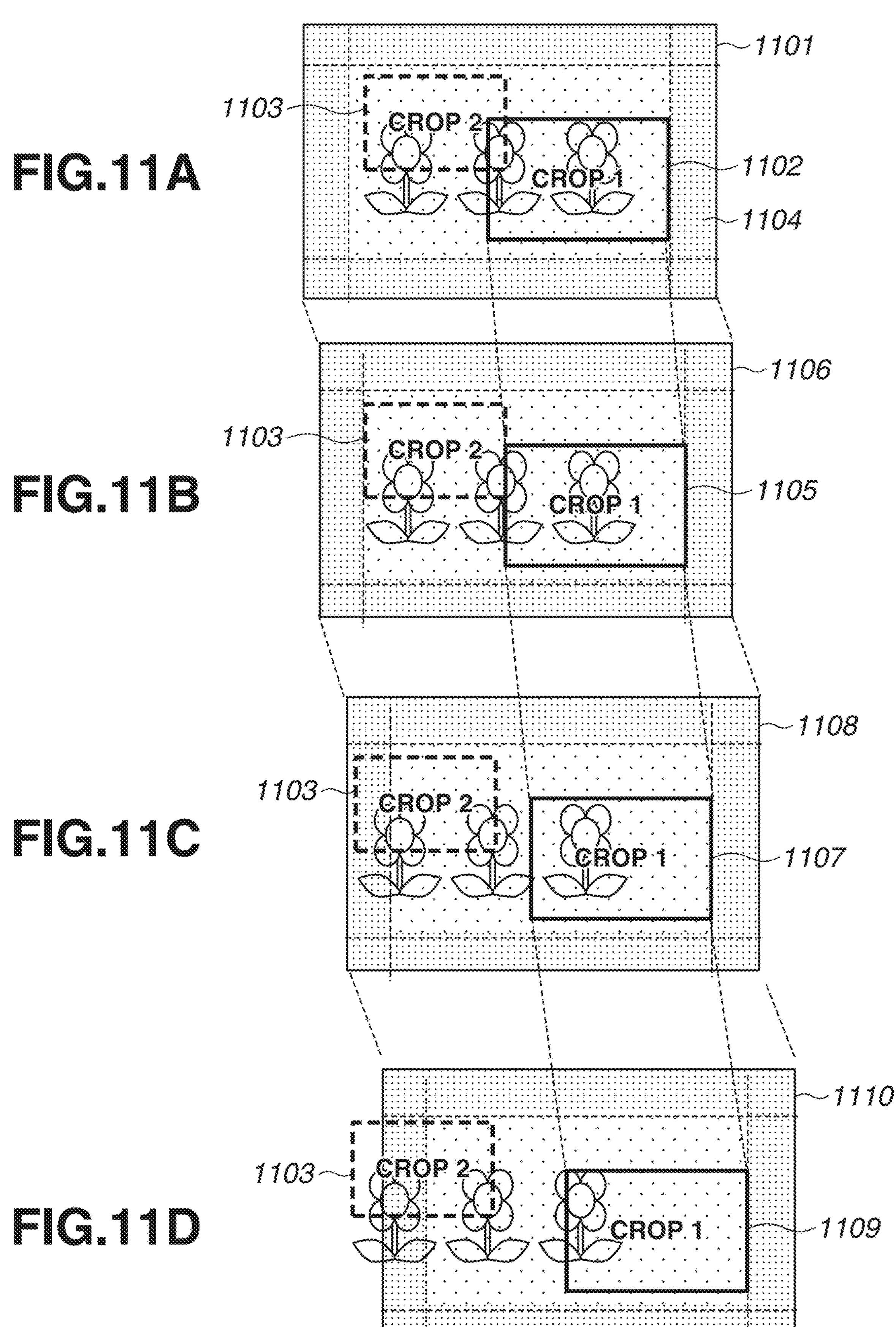
FIGS. 11A to 11D are diagrams illustrating crop regions, an imaging region control start area, and imaging regions of a camera in a case where direction designation control is performed to control a crop region with a high priority level to the right within an angle of view.

FIGS. 11A to 11D are diagrams illustrating crop regions, an imaging region control start area, and imaging regions of the camera 100 in a case where direction designation control is performed to control the crop region with the higher priority level to the right within the angle of view. FIG. 11A illustrates a state before the direction designation control of the camera 100 for the crop region with the higher priority level is started. In the state illustrated in FIG. 11A, the crop region with the higher priority level is cropped at a position 1102 and the crop region with the lower priority level is cropped at a position 1103 in an imaging region 1101 of the camera 100. Further, an imaging region control start area 1104 is set.

FIG. 11B illustrates a state where the crop region that is a target for movement is moved to a position 1105 from the position 1102 in a case where direction designation control of the camera 100 for the crop region with the higher priority level is performed. An imaging region 1106 of the camera 100 is moved so that the crop region that is a target for movement does not interfere with the imaging region control start area 1104. In the state illustrated in FIG. 11B, neither of the crop regions interferes with the imaging region control start area 1104.

FIG. 11C illustrates a state where the crop region that is a target for movement is moved to a position 1107 in a case where direction designation control of the camera 100 for the crop region with the higher priority level is performed. While an imaging region 1108 of the camera 100 is moved so that the crop region that is a target for movement does not interfere with the imaging region control start area 1104, the crop region that is not a target for movement continues to interfere with the imaging region control start area 1104 due to its low priority level.

FIG. 11D illustrates a state where the crop region that is a target for movement is moved to a target position 1109 in a case where direction designation control of the camera 100 for the crop region with the higher priority level is performed. In the state illustrated in FIG. 11D, the crop region with the lower priority level partially extends beyond an imaging region 1110 of the camera 100. As described above, in the case of moving the crop region with the higher priority level, the crop region and the imaging region of the camera 100 are moved so that the presence of the crop region with the lower priority level is ignored. The same applies in the case of performing the position designation control of the camera 100 for the crop region with the higher priority level.

Figures 12A, 12B, 12C, 12D:
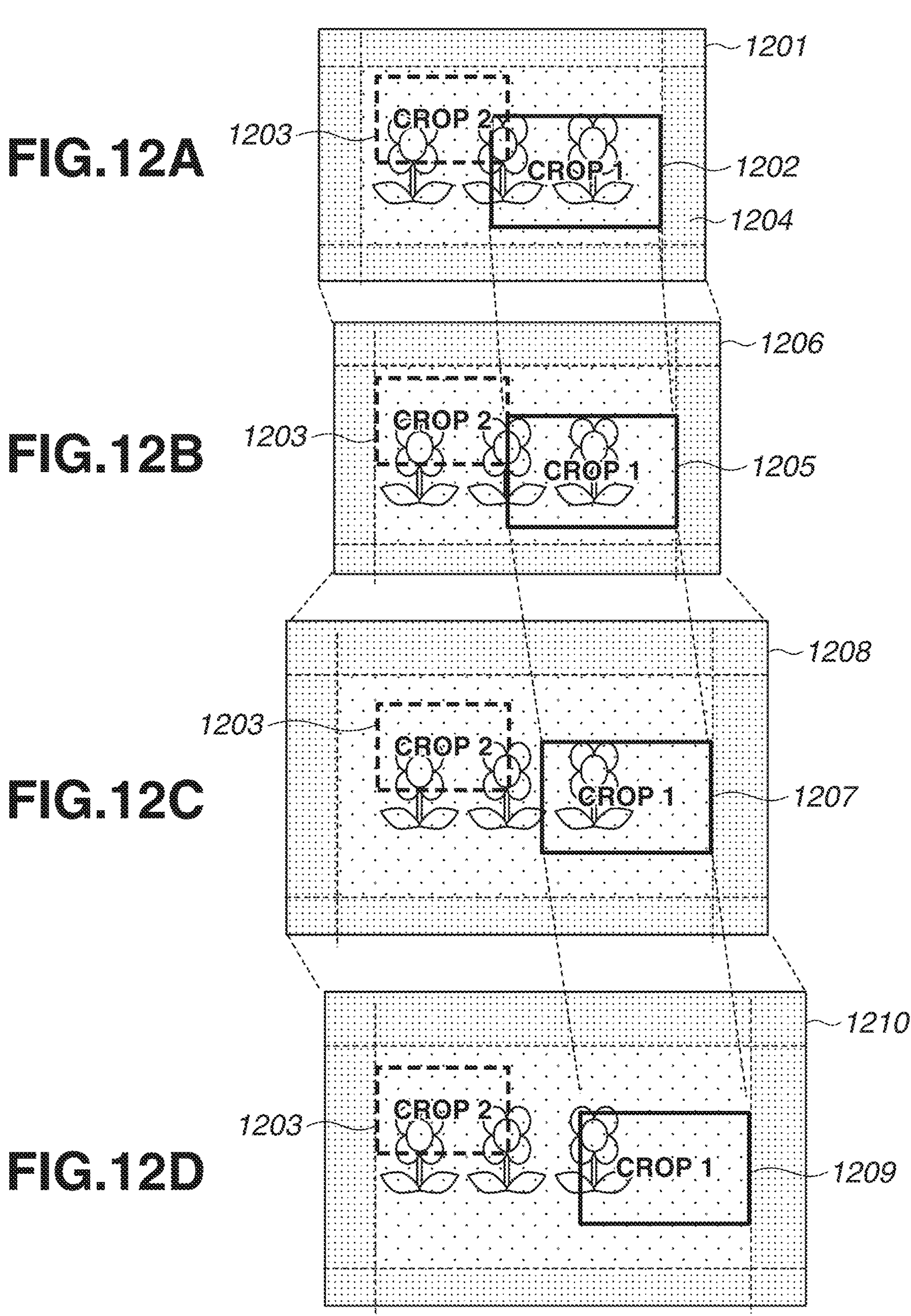
FIGS. 12A to 12D are diagrams illustrating crop regions, an imaging region control start area, and imaging regions of a camera in a case where direction designation control is performed to control a crop region with a low priority level to the right within an angle of view.

FIGS. 12A to 12D are diagrams illustrating crop regions, an imaging region control start area, and imaging regions of the camera 100 in a case where direction designation control is performed to control the crop region with the lower priority level to the right within the angle of view. FIG. 12A illustrates a state before the direction designation control of the camera 100 for the crop region with the lower priority level is started. In the state illustrated in FIG. 12A, the crop region with the lower priority level is cropped at a position 1202 and the crop region with the higher priority level is cropped at a position 1203 in an imaging region 1201 of the camera 100. Further, an imaging region control start area 1204 is set.

FIG. 12B illustrates a state where the crop region that is a target for movement is moved to a position 1205 from the position 1202 in a case where direction designation control of the camera 100 for the crop region with the lower priority level is performed. An imaging region 1206 of the camera 100 is moved so that the crop region that is a target for movement does not interfere with the imaging region control start area 1204. In the state illustrated in FIG. 12B, neither of the crop regions interferes with the imaging region control start area 1204.

FIG. 12C illustrates a state where the crop region that is a target for movement is moved to a position 1207 in a case where direction designation control of the camera 100 for the crop region with the lower priority level is performed.

Since the priority level of the crop region that is not a target for movement is high, the crop region needs to be prevented from interfering with the imaging region control start area 1204. Thus, the CPU 110 controls the image capture I/F 140 to move the zoom of the camera 100 toward the wide side. In the state illustrated in FIG. 12C, each crop region maintains a state of not interfering with the imaging region control start area 1204 in an imaging region 1208 of the camera 100.

FIG. 12D illustrates a state where the crop region that is a target for movement is moved to a target position 1209 in a case where direction designation control of the camera 100 for the crop region with the lower priority level is performed. After the zoom of the camera 100 is increased, an imaging region 1210 of the camera 100 is moved again, and the crop region that is a target for movement is moved to the target position 1209. The zoom of the camera 100 may be moved toward the wide side and the crop region that is a target for movement may be moved to the target position 1209 while the crop region that is not a target for movement and is high in priority level maintains a state of being in contact with the imaging region control start area 1204. Further, in the case of executing the position designation control of the camera 100 for the crop region with the lower priority level, the following process is applied. Specifically, the zoom of the camera 100 is moved toward the wide side until the target position for the crop region that is not a target for movement and is high in priority level and the target position for the crop region that is a target for movement no longer interfere with the imaging region control start area 1204. Then, the crop region that is a target for movement is moved to the target position.

As described above, the present exemplary embodiment makes it possible for the user to operate the crop region without considering the imaging direction of the camera 100 in a case where a plurality of crop regions is set and the position designation control of the image capturing apparatus is performed for one of the crop regions.

(Other Exemplary Embodiments)

The present disclosure can also be realized by a process in which a program for realizing one or more functions of the exemplary embodiments described above is supplied to a system or an apparatus via a network or a storage medium and one or more processors of a computer of the system or the apparatus read the program and execute the read program. Further, the present disclosure can also be realized by a circuit (e.g., application-specific integrated circuit (ASIC)) for realizing one or more functions of the exemplary embodiments.

The disclosure of the exemplary embodiments includes the following configurations, a method, and a storage medium.

(Configuration 1)

A controlling apparatus includes one or more processors, and one or more memories storing instructions that, when executed by the one or more processors, cause the one or more processors to acquire a captured image generated by an image capturing unit, set a portion of the captured image as a crop region, execute a process of changing at least one of a position or size of the crop region within a range of the captured image upon receiving at least one of a request to change the position of the crop region or a request to change the size of the crop region, and change an image capturing region of the image capturing unit so that the crop region does not overlap a predetermined area within the range of the captured image in a case where the crop region overlaps the predetermined area as a result of executing the process.

(Configuration 2)

There is provided the controlling apparatus according to configuration 1, wherein the instructions cause the one or more processors to move the position of the crop region within the range of the captured image upon receiving a request to move the position of the crop region, and wherein in a case where the area overlaps the crop region as a result of moving the crop region, the instructions cause the one or more processors to changes an image capturing direction of the image capturing unit.

(Configuration 3)

There is provided the controlling apparatus according to configuration 1, wherein the instructions cause the one or more processors to change, in a case where the area overlaps the crop region as a result of moving the position of the crop region, an image capturing direction of the image capturing unit to the same direction as a movement direction of the crop region so that the crop region does not overlap the area.

(Configuration 4)

There is provided the controlling apparatus according to configuration 1, wherein the area includes a region having a predetermined width from an end portion of the image capturing region.

(Configuration 5)

There is provided the controlling apparatus according to claim 1, wherein the instructions cause the one or more processors to set, as the area, a region that matches a central coordinate of the crop region within the range of the image capturing region and has a size corresponding to an output resolution, in a case where a request to reduce a range of the crop region is received, and perform control to reduce the image capturing region of the image capturing unit so that the crop region is reduced to conform to the area.

(Configuration 6)

There is provided the controlling apparatus according to configuration 1, wherein the instructions cause the one or more processors to set, as the area, a region with a predetermined width from an end portion of the image capturing region in a case where a request to enlarge a range of the crop region is received, and perform control to change the image capturing region of the image capturing unit so that the area and the crop region do not overlap as a result of enlarging the crop region.

(Configuration 7)

There is provided the controlling apparatus according to configuration 1, wherein the area is set for each of pan, tilt, and zoom.

(Configuration 8)

There is provided the controlling apparatus according to configuration 1, wherein a width of the area is set based on the image capturing region of the image capturing unit and a movement speed of the crop region.

(Configuration 9)

There is provided the controlling apparatus according to configuration 1, wherein the instructions cause the one or more processors to retain, in a case where a plurality of crop regions is set, priority level information about each of the plurality of crop regions, and change the image capturing region of the image capturing unit in response to a request to move one of the plurality of crop regions so that the area does not overlap the crop region to be moved and a crop region with a higher priority level than the crop region to be moved.

(Method)

A controlling method includes acquiring a captured image generated by an image capturing unit, setting a portion of the captured image as a crop region, executing a process of changing at least one of a position or size of the crop region within a range of the captured image upon receiving at least one of a request to change the position of the crop region or a request to change the size of the crop region, and changing an image capturing region of the image capturing unit so that the crop region does not overlap a predetermined area within the range of the captured image in a case where the crop region overlaps the predetermined area as a result of executing the process.

(Storage Medium)

A non-transitory computer readable storage medium containing computer-executable instructions which cause a computer to perform a controlling method includes acquiring a captured image generated by an image capturing unit, setting a portion of the captured image as a crop region, executing a process of changing at least one of a position or size of the crop region within a range of the captured image upon receiving at least one of a request to change the position of the crop region or a request to change the size of the crop region, and changing an image capturing region of the image capturing unit so that the crop region does not overlap a predetermined area within the range of the captured image in a case where the crop region overlaps the predetermined area as a result of executing the process.

Each exemplary embodiment makes it possible to preserve high video quality within a crop region set by cropping a portion of a captured image in a case where an instruction to change the crop region is issued.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-204716, filed Dec. 4, 2023, which is hereby incorporated by reference herein in its entirety.

What is claimed is:

1. A controlling apparatus comprising:

one or more processors; and one or more memories storing instructions that, when executed by the one or more processors, cause the one or more processors to:

acquire a captured image generated by an image capturing unit;

set a portion of the captured image as a crop region;

execute a process of changing at least one of a position or size of the crop region within a range of the captured image upon receiving at least one of a request to change the position of the crop region or a request to change the size of the crop region; and change an image capturing region of the image capturing unit so that the crop region does not overlap a predetermined area within the range of the captured image in a case where the crop region overlaps the predetermined area as a result of executing the process.

2. The controlling apparatus according to claim 1, wherein the instructions cause the one or more processors to move the position of the crop region within the range of the captured image upon receiving a request to move the position of the crop region, and wherein in a case where the area overlaps the crop region as a result of moving the crop region, the instructions cause the one or more processors to change an image capturing direction of the image capturing unit.

3. The controlling apparatus according to claim 1, wherein the instructions cause the one or more processors to change, in a case where the area overlaps the crop region as a result of moving the position of the crop region, an image capturing direction of the image capturing unit to the same direction as a movement direction of the crop region so that the crop region does not overlap the area.

4. The controlling apparatus according to claim 1, wherein the area includes a region having a predetermined width from an end portion of the image capturing region.

5. The controlling apparatus according to claim 1, wherein the instructions cause the one or more processors to:

set, as the area, a region that matches a central coordinate of the crop region within the range of the image capturing region and has a size corresponding to an output resolution, in a case where a request to reduce a range of the crop region is received; and perform control to reduce the image capturing region of the image capturing unit so that the crop region is reduced to conform to the area.

6. The controlling apparatus according to claim 1, wherein the instructions cause the one or more processors to:

set, as the area, a region with a predetermined width from an end portion of the image capturing region in a case where a request to enlarge a range of the crop region is received; and perform control to change the image capturing region of the image capturing unit so that the area and the crop region do not overlap as a result of enlarging the crop region.

7. The controlling apparatus according to claim 1, wherein the area is set for each of pan, tilt, and zoom.

8. The controlling apparatus according to claim 1, wherein a width of the area is set based on the image capturing region of the image capturing unit and a movement speed of the crop region.

9. The controlling apparatus according to claim 1, wherein the instructions cause the one or more processors to:

retain, in a case where a plurality of crop regions is set, priority level information about each of the plurality of crop regions; and change the image capturing region of the image capturing unit in response to a request to move one of the plurality of crop regions so that the area does not overlap the crop region to be moved and a crop region with a higher priority level than the crop region to be moved.

10. A controlling method comprising:

acquiring a captured image generated by an image capturing unit;

setting a portion of the captured image as a crop region;

executing a process of changing at least one of a position or size of the crop region within a range of the captured image upon receiving at least one of a request to change the position of the crop region or a request to change the size of the crop region; and changing an image capturing region of the image capturing unit so that the crop region does not overlap a predetermined area within the range of the captured image in a case where the crop region overlaps the predetermined area as a result of executing the process.

11. A non-transitory computer readable storage medium containing computer-executable instructions which cause a computer to perform a controlling method comprising:

acquiring a captured image generated by an image capturing unit;

setting a portion of the captured image as a crop region;

executing a process of changing at least one of a position or size of the crop region within a range of the captured image upon receiving at least one of a request to change the position of the crop region or a request to change the size of the crop region; and changing an image capturing region of the image capturing unit so that the crop region does not overlap a predetermined area within the range of the captured image in a case where the crop region overlaps the predetermined area as a result of executing the process.

* * * * *